United States Patent [19]
Meyers

[11] Patent Number: 5,193,244
[45] Date of Patent: Mar. 16, 1993

[54] DETACHABLE HAND TROWEL

[76] Inventor: Lawrence G. Meyers, 1290 E. 1375 North, Layton, Utah 84040

[21] Appl. No.: 629,388

[22] Filed: Dec. 18, 1990

Related U.S. Application Data

[63] Continuation-in-part of Ser. No. 321,193, Mar. 9, 1989, abandoned.

[51] Int. Cl.$^5$ .............................................. B05C 17/10
[52] U.S. Cl. ................................. 15/235.4; 15/245.1; 15/145; 16/114 R; 403/353; 403/381
[58] Field of Search .................. 15/104 S, 145, 176.1, 15/176.4–176.6, 235.4–235.8; 16/114 R; 81/489; 403/353, 381

[56] References Cited

U.S. PATENT DOCUMENTS

| | | | |
|---|---|---|---|
| 830,683 | 9/1906 | Spangler | 15/235.4 |
| 2,771,325 | 11/1956 | Brunson | 15/235.4 |

FOREIGN PATENT DOCUMENTS

| | | | |
|---|---|---|---|
| 196727 | 3/1908 | Fed. Rep. of Germany | 403/353 |
| 2700739 | 7/1978 | Fed. Rep. of Germany | 15/235.4 |
| 905451 | 12/1945 | France | 403/381 |
| 502500 | 11/1954 | Italy | 16/114 R |
| 3331 | 11/1868 | United Kingdom | 15/235.4 |
| 3845 | 2/1899 | United Kingdom | 16/114 R |

Primary Examiner—Harvey C. Hornsby
Assistant Examiner—Mark Spisich
Attorney, Agent, or Firm—Trask, Britt & Rossa

[57] ABSTRACT

A trowel handle having a blade, one or more upright supports mounted on that blade and a handle adapted for detachably engaging that support is disclosed. The handle includes a channel having tapered sidewalls configured to form a wedge-like engagement with a respective support, thereby precluding the handle's displacement relative to the blade absent the imposition of a force of considerable magnitude directed in a preselected direction.

10 Claims, 15 Drawing Sheets

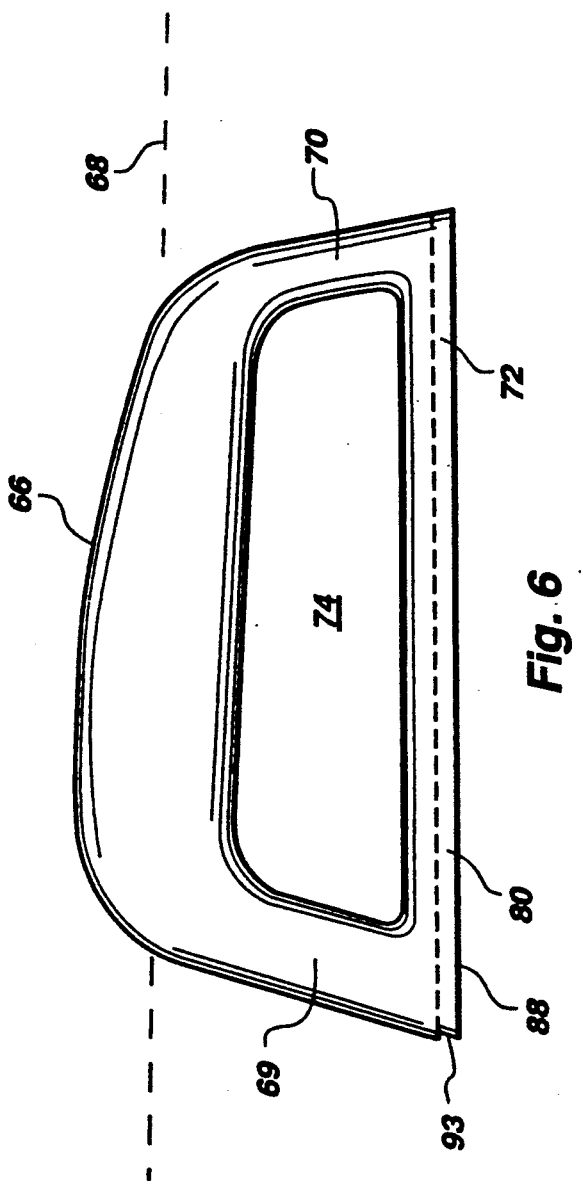
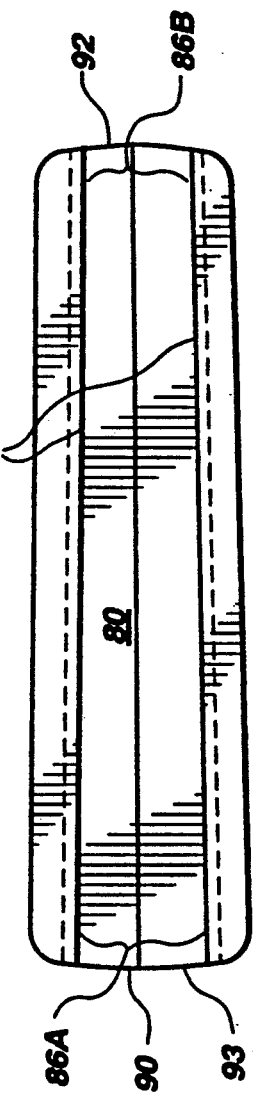
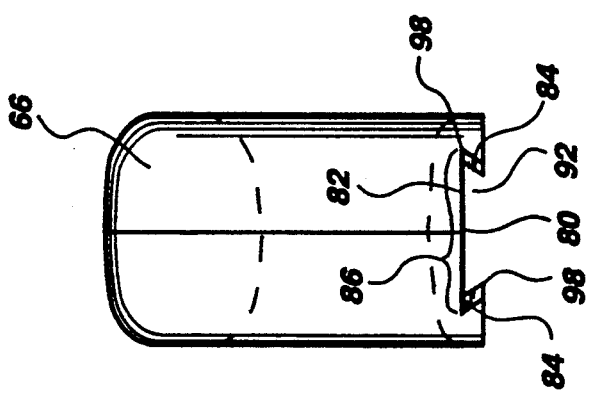

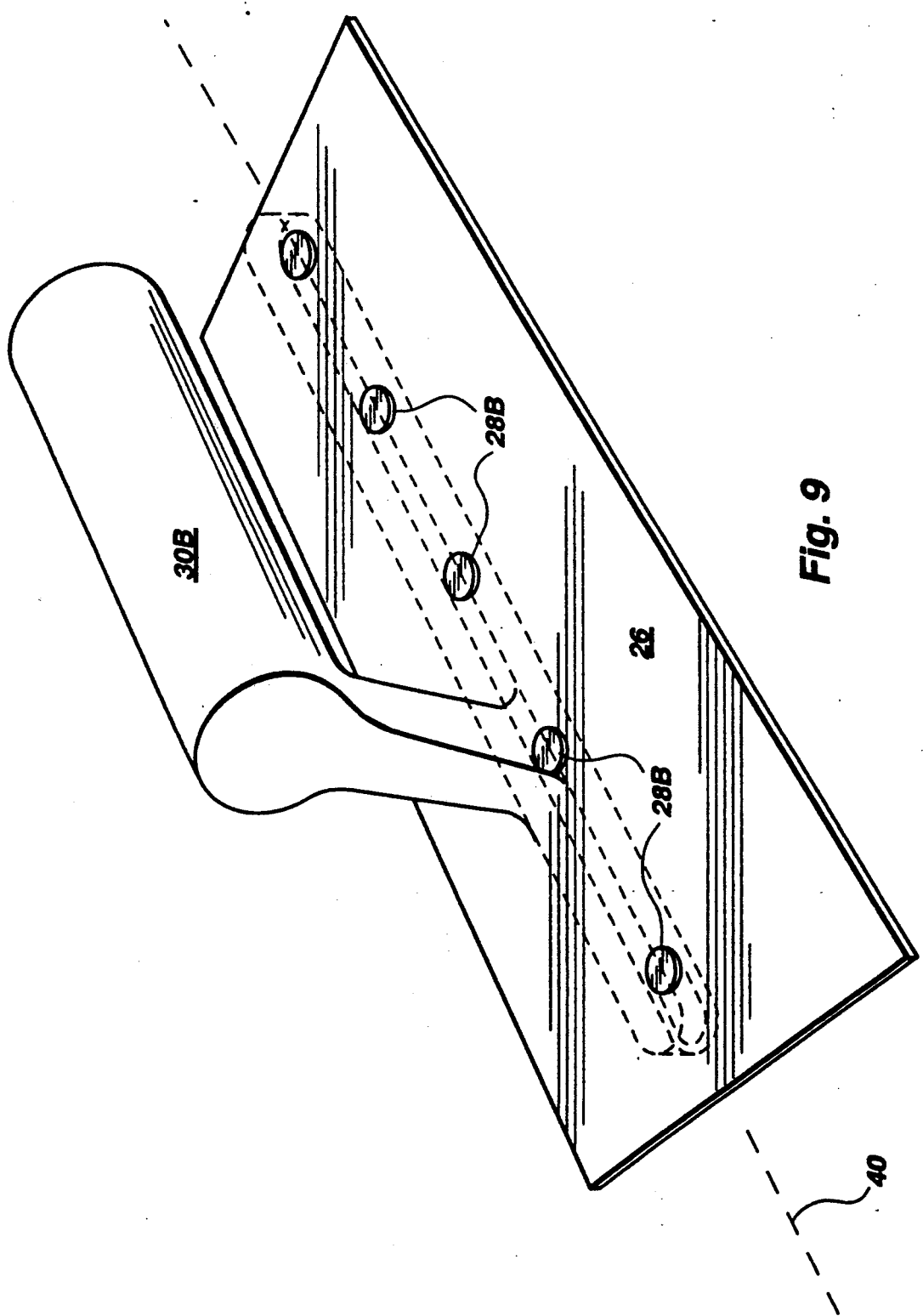

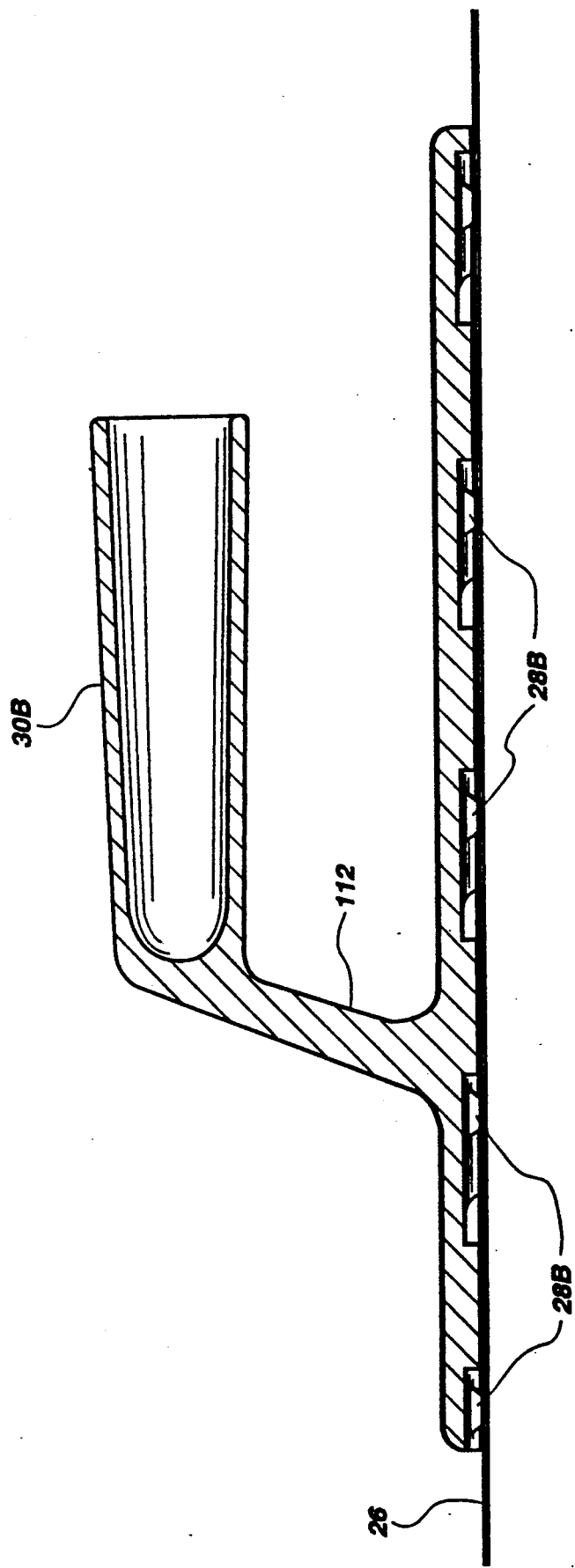

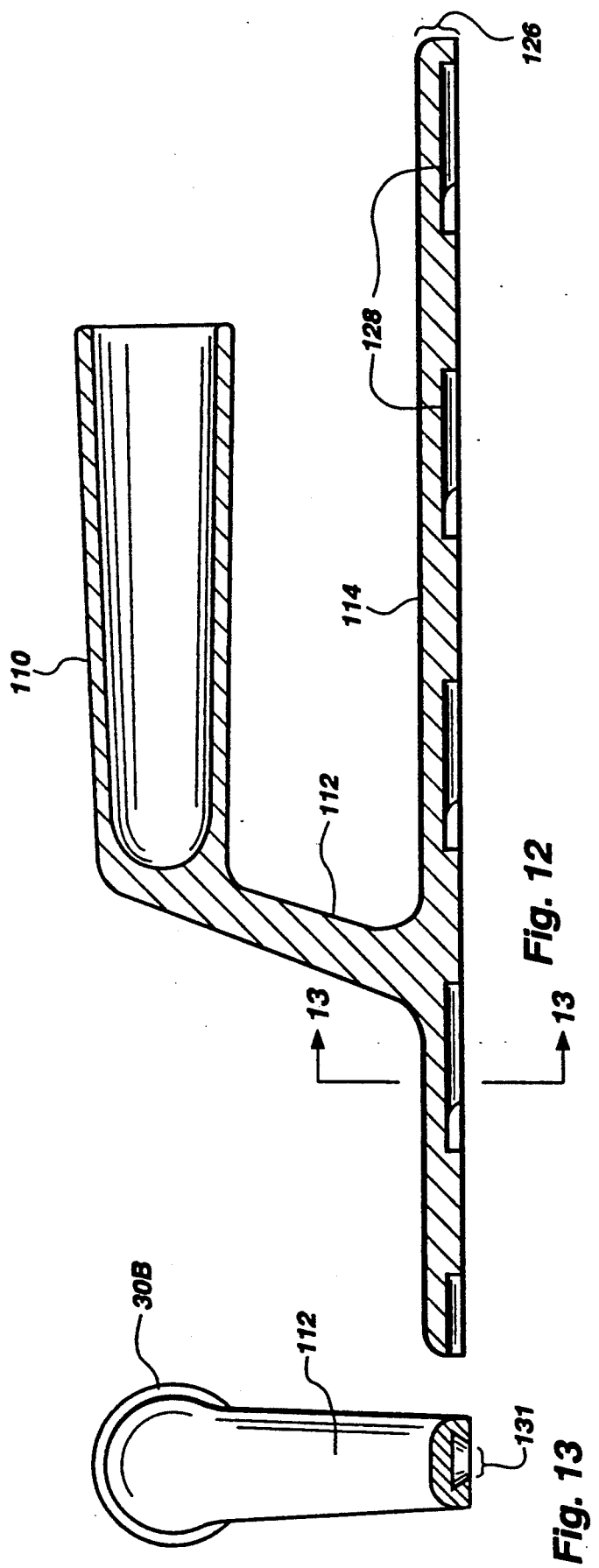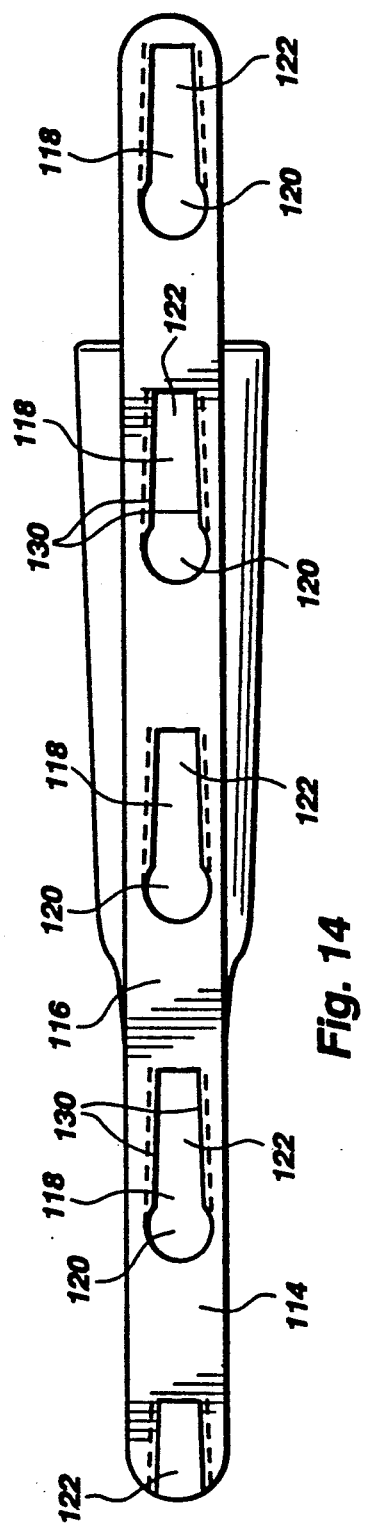

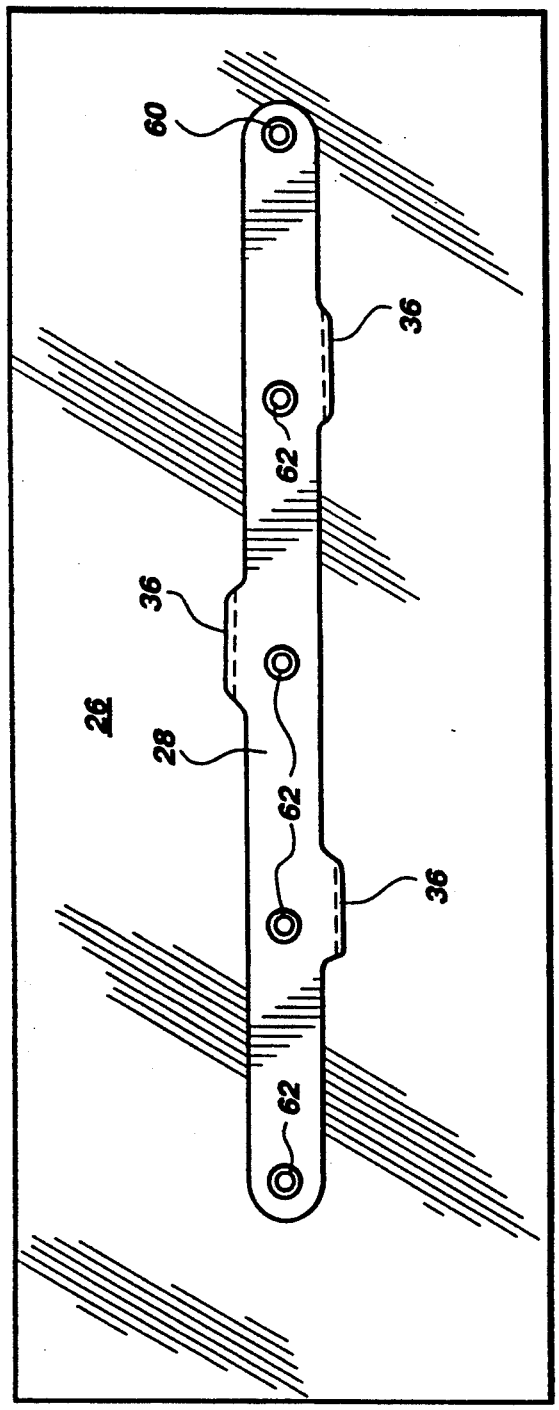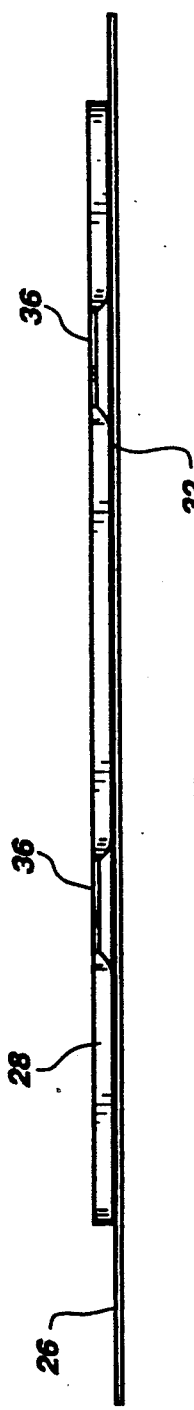

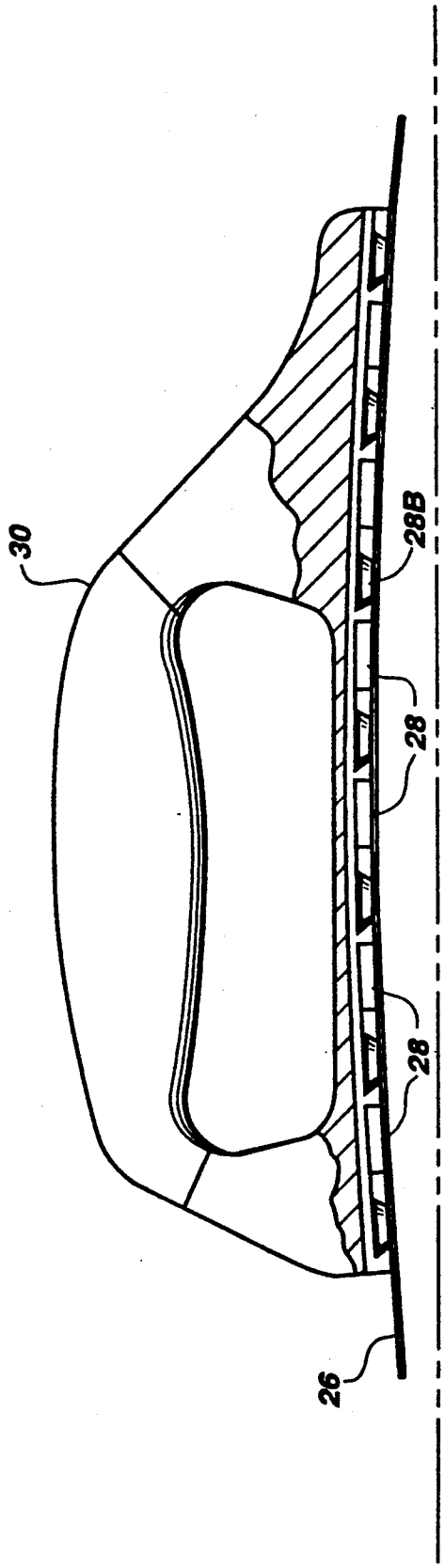
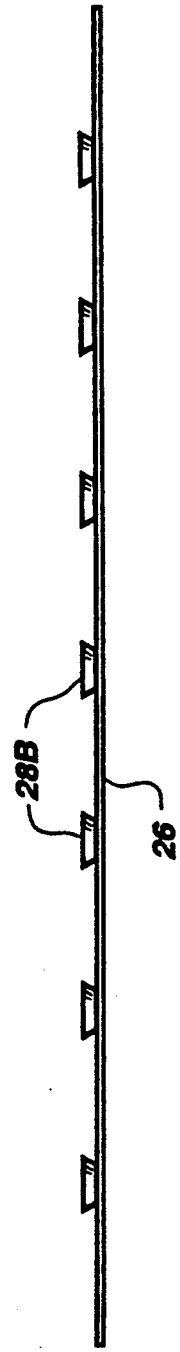

DETACHABLE HAND TROWEL

This is a continuation-in-part of U.S. patent application Ser. No. 321,193 filed Mar. 9, 1989, entitled "DETACHTABLE HANDLE TROWEL", abandoned.

BACKGROUND OF THE INVENTION

1. Field

This invention relates to implements adapted for spreading and otherwise distributing fluid or semi-fluid material. More particularly, the invention is directed to implements for use in spreading paste-like materials such as plaster, cement, adhesives, or other paste-like material.

2. State of the Art

For centuries, building techniques have involved the use of adhesives, plaster, cement and other paste-like materials. Many construction techniques require means of removing a paste-like material from a supply thereof and transferring a given quantity to an application site. Thereafter, the means is often used to spread the material over the application site to achieve a selected thickness preparatory to the application of another building material, such as flooring, tile or other material.

Trowels of various configurations have been used for many years to effect the aforesaid function. In appearance, a trowel conventionally includes a flat planar blade which is oftentimes quadrilateral in shape. A handle is fixedly mounted to the blade to extend uprightly therefrom, thereby providing a means of manipulating the blade. The handle may include a cylindrically shaped member configured to be grasped by the user. The longitudinal axis of the handle is generally oriented horizontally and parallel to the longitudinal axis of the blade.

Specialized trowels have been developed for use in smoothing out irregularities created during the application of paste-like compounds, wet cement, and adhesive emulsions such as latex, acrylic, asphalt, vinyl, epoxies, and thin set gypsum compounds. Such trowels typically include a blade configured for handling a specific material. For example, a trowel blade adapted for a smoothing plaster-like leveling compounds on walls and floors is generally flat or may have a slight concave curl to the smooth edge of the blade. The longitudinal edges of such trowels are the primary working surfaces. The trowel is used by holding the blade at an acute angle (e.g. 10-35°) to the surface to be worked. Pressure is applied to the trowel as it is drawn across the surface, driving a puddle of leveling compound before it. Due to the abrasive nature of the leveling compounds and the substrate over which these compounds are applied, over time, the edges of the blade are abraded and worn, eventually narrowing the blade. Trowels directed for use in smoothing wet cement include blades configured to be slightly convex across their width and curled in the same direction on the front and back ends. In use, the entire bottom smooth surface of such blades are utilized. Owing to the abrasive nature of the cement being spread and the substrate over which the cement is applied, the blade edges are abraded and actually become razor sharp as the blade narrows. Understandably, over time the blade becomes less effective while also becoming a safety hazard to the user. The moderate or severe wear and abrasion on the blade edges of a trowel appreciably depreciate the functionality of a trowel, specifically when smoothing operations are involved.

Due to the fixed mounting of the trowel blade on the handle, the deterioration of a blade has in the past forced the user to purchase an entire new trowel. Recently, attempts have been made to provide trowels wherein the blade is made removable from the handle. Since handles typically are subjected to minimal wear, one handle may be used with a succession of replacement blades, thereby providing an economical means of meeting the need for efficient trowels.

An example of a detachable handle trowel involves a planar blade defining a pair of keyhole slots positioned spacedly apart therein. The handle includes a pair of outwardly extending nut-fitted bolts. Each bolt is first threaded onto the handle from the bottom by means of its slotted head. A thumb screw is then tightened down against the handle from the top like a jam nut to keep the bolt from rotating loose. If the blade is to be replaced, the thumb screws are first loosened then the screws are loosened from the bottom. In this particular design, the head of the bolt, which passes through the slot, extends below the bottom surface of the blade. This construction destroys the smooth planarity of that bottom blade surface, and hinders the use of the trowel as a means of producing a smooth paste surface since the bolt head is constantly digging into the paste as the blade is driven over the paste.

While the aforesaid trowel has provided a means of some benefit in addressing the above concerns, there continues to be a need for a trowel which at once addresses the problem of providing a replaceable blade capability while simultaneously providing a means of maintaining the smooth planar bottom working surface of the trowel.

SUMMARY OF THE INVENTION

A trowel of the invention includes a blade, and a support mounted on that blade to form a blade assembly. A handle, having a connection means associated therewith, is adapted for detachably connecting the handle with the support. The connection means is adapted for being attached and detached without the need for tools.

The blade may be fabricated in a variety of configurations. For example, the invention may include blades having a smooth, flat bottom surface, a bottom surface having a convex or concave curl defined therein (either on the ends thereof or across the width) or notched edges. Though the blade may contain apertures therein, the trowel is configured such that no structure e.g. fasteners or other connection means, extends below or outwardly from the blade's bottom surface. More specifically, the support and connection means are positioned in or above the blade such that they do not extend below the bottom surface of the blade. An important feature of the invention is the use of a connection means whose use and operation does not interfere or interrupt the smooth bottom surface of the blade and thereby does not impede the use of the blade in smoothing-type operations.

The support may be an elongate member which extends longitudinally along a length of the blade. Alternatively, the support may be configured as a plurality of individual supports.

In those embodiments having an elongate support, that support may be tapered over its length. The support or supports may be configured to have vertically upright sidewalls which are preferably tapered. In one embodiment, the sidewalls are tapered whereby the width of the support increases over the height of the support, i.e., the support obtains a minimum width proximate its mounting on the blade and increases in width over the height of the support. Each support may include one or more laterally extending wings or extensions which likewise may have sidewalls presenting a tapered appearance. These extensions may be arranged on opposing sides of the support along a length thereof. In some embodiments, the extensions may be arranged in a symmetric, opposing arrangement while in other embodiments the placement of the extensions may be staggered along a length of the support.

The support may be fabricated from a substantially rigid material, e.g. steel, and may be configured to extend over a substantial length of the blade. In particular embodiment, the support functions as a stiffening means for adding a degree rigidity to the planar blade.

In a preferred embodiment wherein a flexible blade is fitted with a plurality of upstanding spacedly mounted supports, the blade together with its supports forms a longitudinally flexible blade assembly. Due to the flexibility of the blade assembly upon the blade handle being attached to the blade assembly, the blade assembly adopts a configuration which conforms to the bottom surface of the handle. It follows that a manufacturer may produce a single generic blade assembly and a number of blade handles of different bottom surface configurations. The blade assemblies would then be mountable on the various handles to produce a variety of specially configured blade working surfaces.

The handle of the trowel includes one or more enclosed channels or slots, each having a single respective inlet opening. Each channel is dimensioned and configured to receive and engage a respective support and form a detachable union therewith. Each channel may generally include an elongate section defined by sidewalls having a tapered appearance over their height. The channel may also be tapered over its length. The handle may include one or more flanges which extend into the channel to form a means of engaging the tapered supports and forming a union therewith upon a longitudinal displacement of the handle relative to the blade.

In those embodiments wherein the supports are not elongate in configuration, the handle may be manufactured of a substantially rigid material. This material choice facilitates the handle's function as a stiffening means for the blade upon that handle being brought into a contiguous relationship with that blade.

In some embodiments, each of the channels or slots may be fitted with a drain channel for removing paste or semi-fluid material therefrom. These drain channels may be interconnected whereby material collected in one or more channels or slots may be directed to a common discharge outlet adapted for directing the material out of the handle.

The blade and handle are adapted to permit the blade fitted support(s) to be inserted into the handle channel inlet opening and thereafter, a longitudinal displacement of the handle relative to the blade effects a union of the handle and blade as the tapered supports engage the channel flanges.

BRIEF DESCRIPTION OF THE DRAWINGS

FIG. 6 is a side view of a trowel handle of the invention;

FIG. 7 is an end view of the trowel handle of FIG. 6;

FIG. 8 is a bottom view of the trowel handle of FIG. 6;

FIG. 9 is a perspective view of an alternate embodiment of the trowel of the invention, the lower section of the handle being shown in phantom for clarity;

FIG. 10 is a cross-sectional side view of the trowel of FIG. 9 taken along section line 10—10;

FIG. 12 is a cross-sectional side view of the trowel handle of FIG. 9;

FIG. 13 is a cross-sectional end view of the trowel of FIG. 12 taken along sectional line 13—13;

FIG. 14 is a bottom view of the handle of FIG. 13;

FIG. 18 is a top plan view of an alternative embodiment of the support shown in FIG. 1;

FIG. 19 is a side view of the support shown in FIG. 18;

FIG. 20 is an end view of the support shown in FIG. 18;

FIG. 27 is a side view of an alternative handle and blade assembly construction of the invention;

FIG. 28 is a side view of a blade assembly adapted for use with the construction of FIG. 27;

DETAILED DESCRIPTION OF THE DRAWINGS

Figure 1:
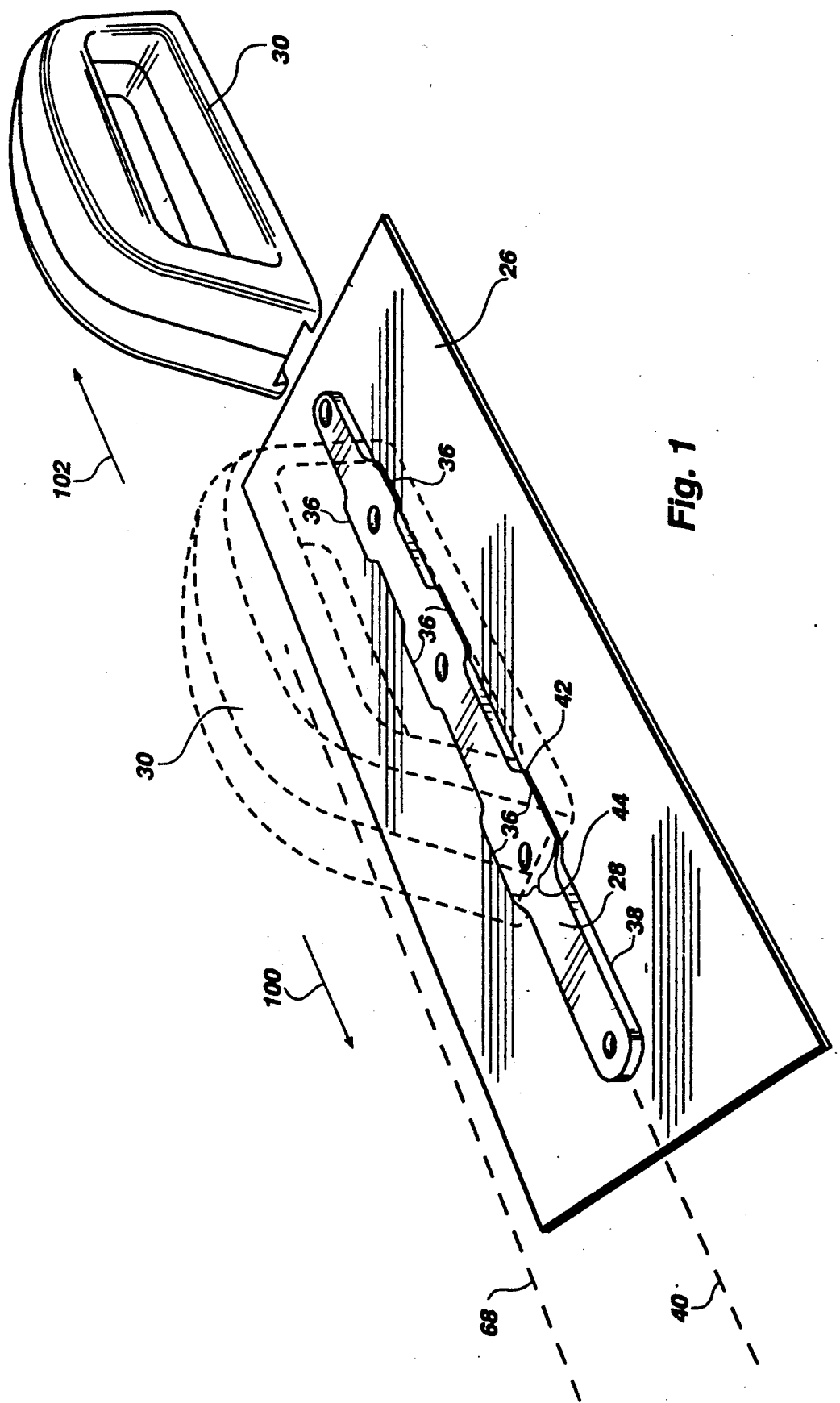
FIG. 1 is a perspective view of the trowel of the invention. The handle is shown in a solid line representation detached from the blade and in a phantom view representation secured to the blade.
Figure 2:
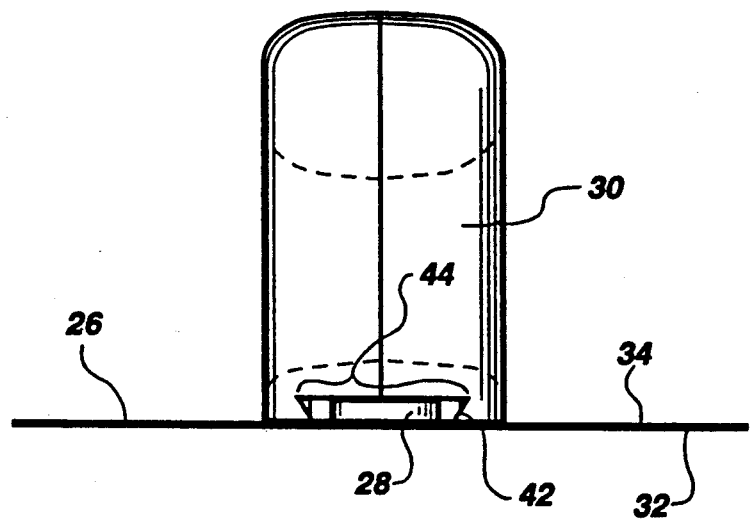
FIG. 2 is an end view of the trowel shown in FIG. 1.

As shown in FIG. 1, a trowel of the instant invention includes a blade 26, a support 28 and a handle 30.

The Blade

Blade 26 is a flat planar member having a smooth, uninterrupted planar bottom surface 32 and a smooth planar top surface 34. Whereas the top surface 34 is mounted with a support 28 which extends outwardly from the surface 34, the bottom surface 32 is completely planar and flat. This particular planar configuration of the bottom surface 32 is important in that this is the working surface which is utilized in smoothing the plaster or cement surface being worked on by the trowel. In contrast to the aforesaid conventional detachable handle trowel, which has a bottom surface which defines openings and irregularities, e.g. bolt heads, the instant invention includes a bottom surface 32 which is completely free of any protruding structure which could frustrate the smoothing function of the trowel.

Blade 26 has a very thin thickness and is preferably manufactured of a somewhat rigid yet flexible material, e.g. steel. As shown, blade 26 has a generally quadrilateral configuration. While this shape is preferred, other blade configurations are equally adaptable to the invention. The blade is longitudinally flexible.

While the aforesaid description is directed to a smooth, planar blade construction, it should be understood that the invention is equally directed to blades which (1) have a slight concave curl to the smooth bottom blade surface; (2) are configured to be slightly convex across the blade width and slightly curled in a common direction on the blade's front and rear ends; or (3) are configured to include notched edges. In brief, the instant invention is adapted for use with substantially any conventional blade construction.

The Support

Support 28 is an elongate member which extends substantially over the length of the blade 26. Fabricated of a generally rigid material, the support 28 is fixedly mounted to the blade 26 to give integrity and some degree of rigidity to the thin flexible blade 26. As shown, support 28 has a thickness considerably larger than the blade 26. In the embodiment illustrated in FIG. 1, the support 28 includes a plurality of wings or extensions 36 which extend laterally from the main support structure. Each extension 36 is mounted in the upstanding sidewall 38 of the support 28. In the embodiment of FIG. 1, the extensions 36 are grouped in pairs, each extension being positioned opposite a companion extension mounted on an opposing sidewall and about a longitudinal axis 40 of the support 28. For example, an extension 36A is shown positioned symmetrically with an extension 36B about longitudinal axis 40.

Each pair of extensions 36 are positioned spacedly apart from an adjacent pair of extensions along the length of the support 28. Though the symmetric positioning of the extensions is a preferred construction, the invention also includes the spacing of the extensions in a non-symmetric arrangement wherein the extensions are arranged in a generally staggered orientation along the length of the support as shown in FIG. 18.

Figure 4:
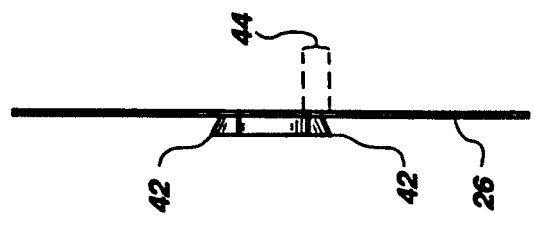
FIG. 4 is an end view of the blade of FIG. 3.
Figure 3:
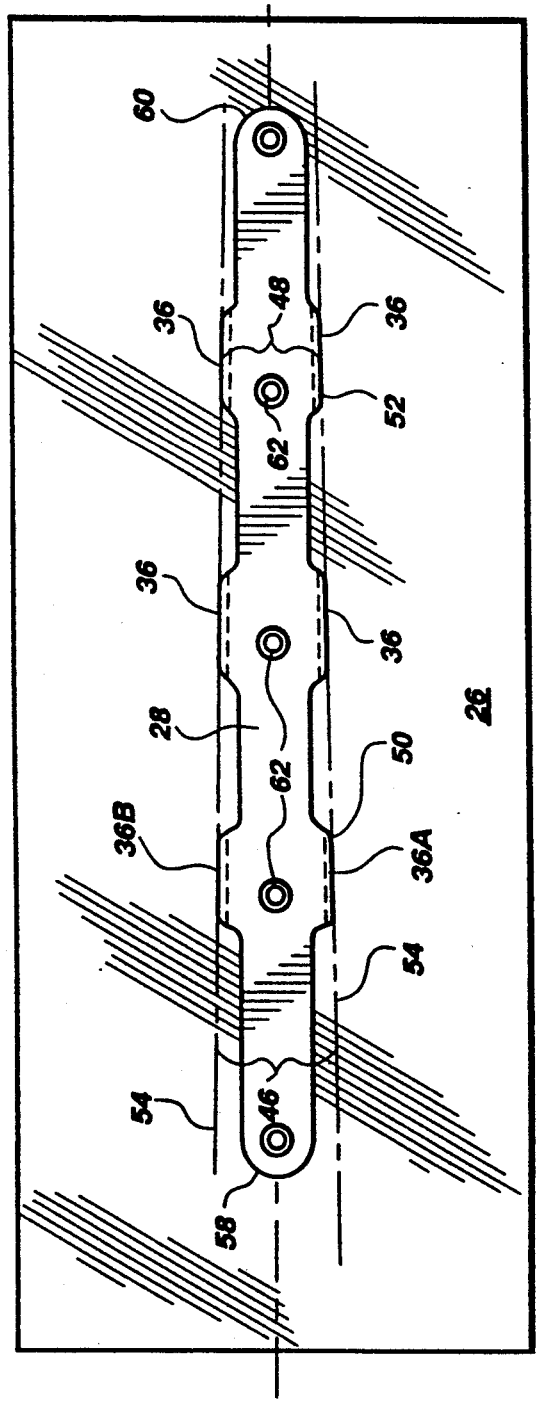
FIG. 3 is a top plan view of a trowel blade of the invention.
Figure 5:
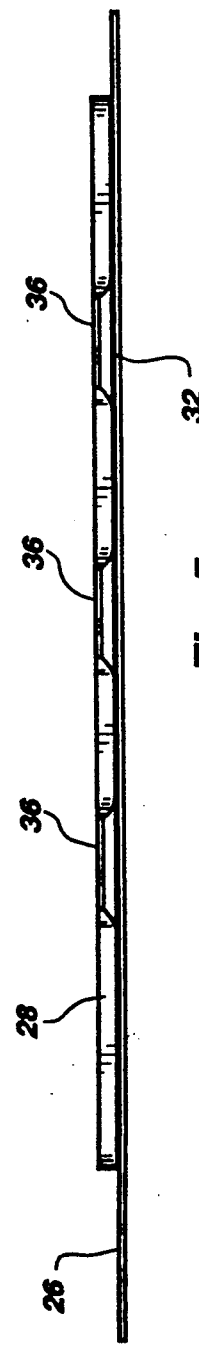
FIG. 5 is a side view of the blade of FIG. 3.

The outwardly facing end 42 of each extension is beveled (FIGS. 3 and 4). More specifically, the ends are tapered, with the width 44 of the extension obtaining a minimum width proximate the extension's abutment with the blade 26. As the extension extends upward, the endwall flares outwardly, continuously increasing the width 44 of the extension 36.

As illustrated in FIG. 3, the width 46 of the support 28 may be tapered over the length of the support. In FIG. 3, this tapering is shown by the decreasing width 44 of each succeeding pair of extensions 36, i.e., extension pair 50 are noticeably wider than extension pair 52. As shown by the dotted lines 54, the effective width 56 of the support 28 decreases from support end 58 to support end 60.

Recognizably, this particular tapered design over the length of the support may be achieved by eliminating the extensions 36 and forming the support 28 to include substantially linear edges corresponding to the dotted lines 54 in FIG. 3.

The support 28 may be fixedly mounted to blade 26 by a number of means. As shown, upstanding rivets 62 secured to blade 26 may be secured to support 28 in a manner known in the art.

The Handle

Handle 30 includes a substantially cylindrical section 66 configured to be grasped by the user's hand. As shown, the longitudinal axis 68 of that section 66 extends generally horizontally and substantially parallel to the longitudinal axis 40 of the blade 26. The section 66 is supported at each of its opposing ends by an upright support, respectively supports 69, 70 which are connected to section 66. A horizontally extending base support 72 is connected to each support 69 and 70 to form a foundation therefor. The handle 30 forms a generally "D"-shaped configuration defining an opening 74 therein through which the user's hand may pass to facilitate grasping the section 66.

The base support 72 defines an elongate channel 80 therein which is shown extending along the complete length of that support 72. Channel 80 includes a planar ceiling 82 and a pair of opposing tapered or beveled sidewalls 84. As shown to advantage in FIG. 6, each channel sidewall flares outwardly over the height of the channel 80, whereby the channel 80 obtains a minimum width 86 proximate the lower surface 88 of the handle. The channel 80 has a maximum width 86 proximate the ceiling 82.

The width of the channel 80 is dimensioned to correspond with the width of the support 28.

As shown in FIG. 8, the width of the channel 80 decreases over the length of the channel. In the embodiment shown in FIG. 8, that width decreases continuously from the end 90 of the channel to the channel end 92. The width 86A is dimensioned to correspond with a width of the support/extension arrangement between the opposing ends 58 and 60 of that support. The width 86B is likewise dimensioned to correspond to a width of the support 28 between opposing ends 58 and 60.

Channel 80 includes an open inlet opening 93 which is dimensioned to receive the end 60 of the support 28 and direct that support into channel 80. As shown in FIG. 1, a detached handle 30 may be mounted to a blade 26/support 28 arrangement by aligning the respective longitudinal axis 40 and 68 of the components. The support 28 is then inserted into inlet opening 93 as the handle is displaced longitudinally along a length of the blade 26. As the handle 30 proceeds along a length of the blade 26, eventually the tapered channel 80 begins to tighten about support 28 until the handle 20 is eventually wedged on the support 28 into a tight engagement. Due to the placement of the channel-defining flange-like lips 98 of the handle under the outwardly flaring extensions 36, the handle 30 is precluded from being displace upwardly away from the blade. The tapered wedge fit of the channel 80 about the support precludes a further displacement of the handle 30 in the direction indicated by arrow 100. The wedging action is also sufficient owing to the composition of the handle and the support 28 to preclude a displacement of handle 30 in the direction indicated by arrow 102 absent the application of a considerable force to the handle.

To disengage the handle 30, the user applies a force to the handle 30 in the direction indicated by arrow 102, thereby displacing the handle 30 in that direction relative to the blade 26 until the handle clears the support 28.

First Alternative Embodiment

Figure 17:
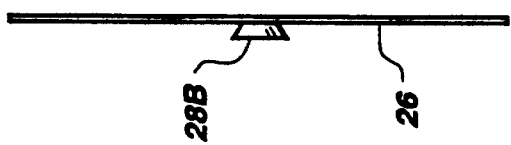
FIG. 17 is an end View of the blade shown in FIG. 15.
Figure 15:
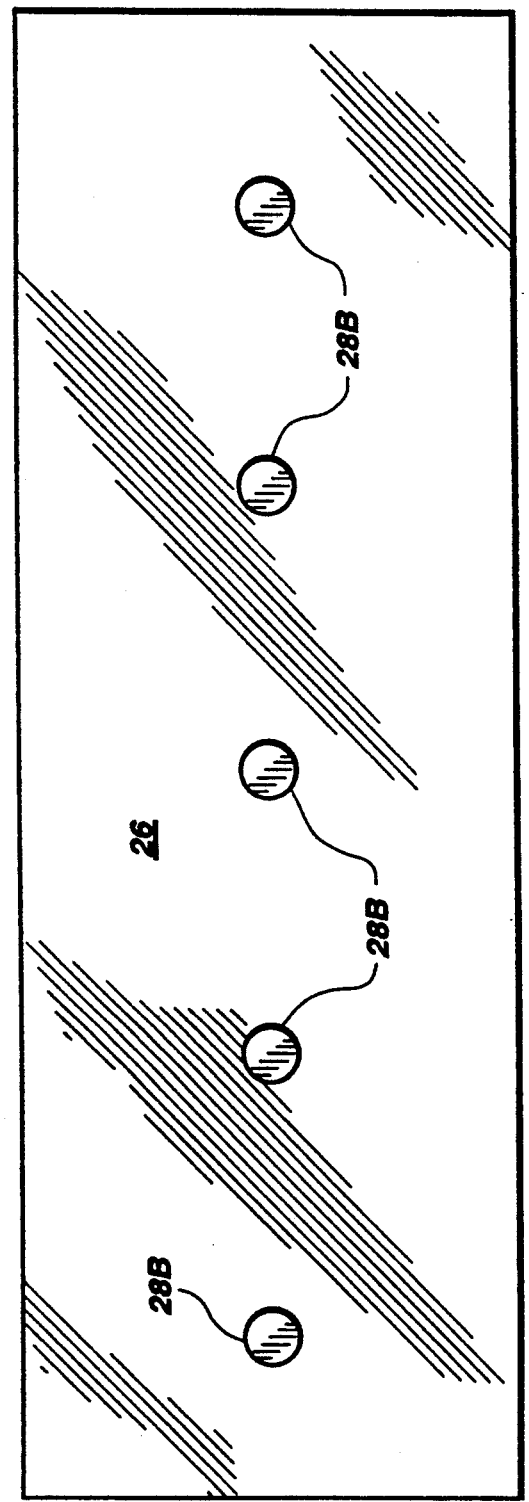
FIG. 15 is a top plan view of the trowel blade of the trowel embodiment of FIG. 9.
Figure 16:
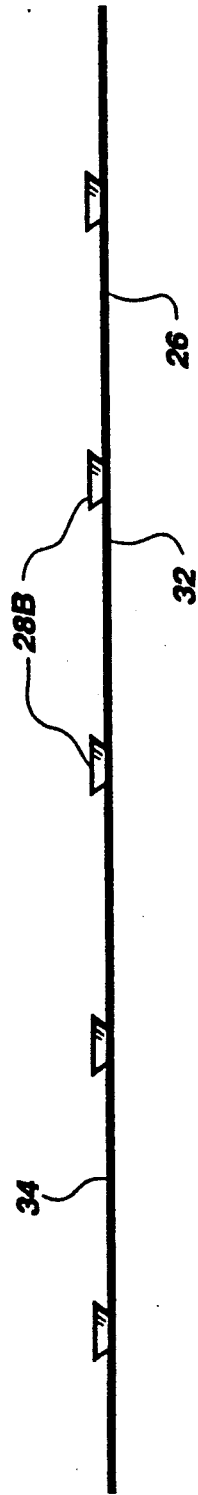
FIG. 16 is a side view of the blade shown in FIG. 15.

FIGS. 9-17 illustrate an alternative embodiment of the invention. In this particular construction, the blade 26 is fitted with a plurality of individual supports 28B which are positioned spacedly apart from one another longitudinally along a length of the blade 26. In this construction, the supports 28B in association with the blade 26 form a longitudinally flexible member which may be formed into a variety of configurations. As shown in FIGS. 15-17, each support 28B is configured as an inverted truncated cone. The supports 28B are arrange substantially linearly along the longitudinal axis 40 of the blade 26. Each support 28B may be mounted to the blade 26 by a means known in the art. As shown in FIG. 17, the bottom surface 32 of the blade 26 is free of any irregularity which would disrupt its planar appearance.

The handle 30B includes a generally cylindrical section 110 conjoined to an upstanding support 112. Thus support 112, in turn, is mounted to a longitudinally extending base support 114, adapted for contiguous placement on blade 26. FIG. 13 illustrates the particular slotting arrangement of handle 30B. As shown, the bottom surface 116 of base support 112 defines a plurality of slots 118 which are positioned spacedly apart from one another along the length of the base support 114. Each slot 118 includes a generally circular inlet opening 120 and a contiguous elongate channel 122. In appearance, each slot 118 appears like a keyhole. Both the inlet 120 and channel 122 are open-sided openings communicating with the bottom surface 116 of base support 114.

Both the inlet 120 and channel 122 of each slot 118 is generally enclosed and each extends only partially through the height 126 of the base support 114 as shown in FIGS. 12 and 13. The upper surface or ceiling 128 of the channel 122 and inlet opening 120 is planar over the length of the slot 118. The open sides of the channel 122 are shown in FIGS. 13 and 14 as being tapered. The edges 130 of the handle 30B which define the edge of the open side of each channel 122 define a minimum width 131 of the channel 122. The width 131 of the channel increases over the height of the channel as is shown to advantage in FIG. 13. Each channel 122 is configured and dimensioned to correspond with a respective upright support 28B.

Figure 11:
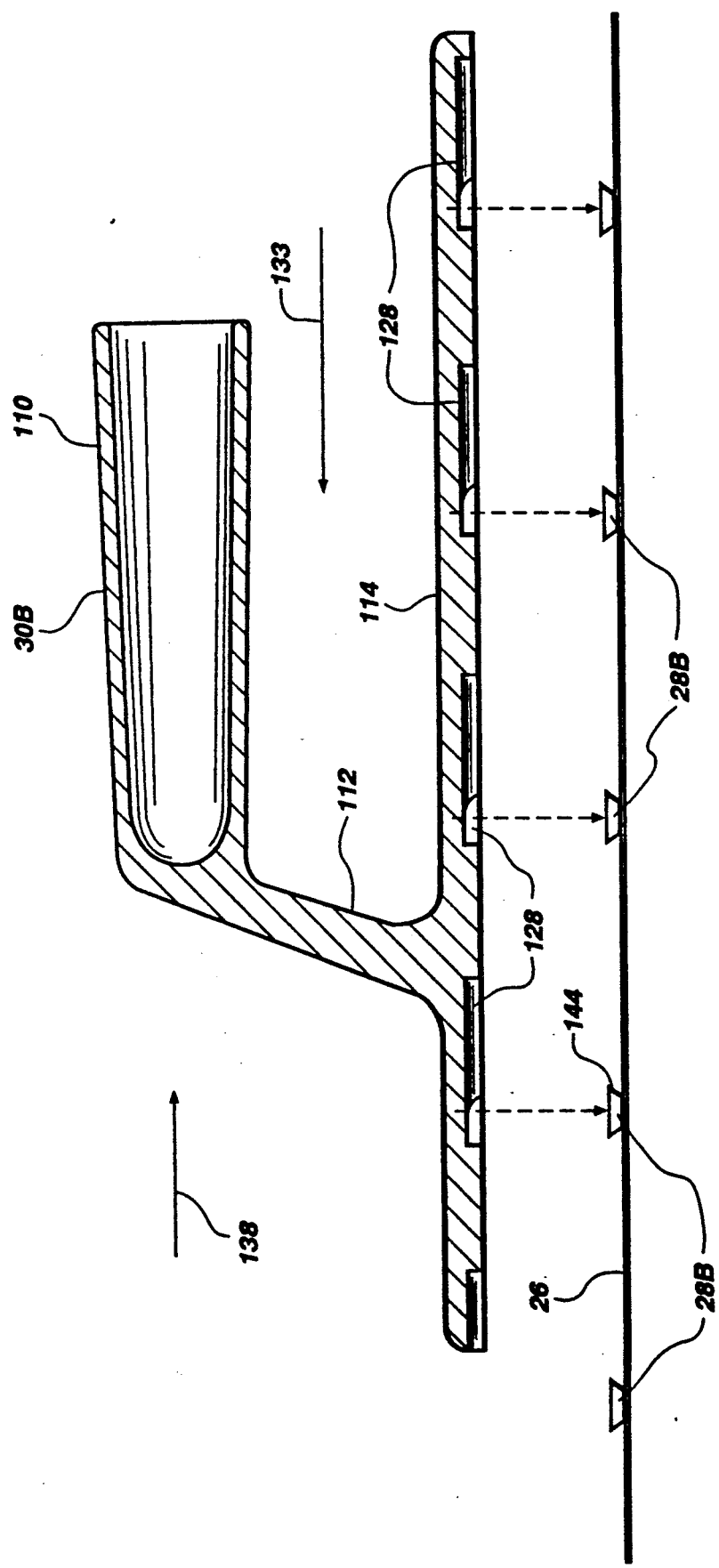
FIG. 11 is an exploded cross-sectional side view of the trowel of FIG. 10.

In order to attach the handle 30B to blade 26, each inlet opening 120 is dimensioned to receive a respective support 28B when the handle 30B is vertically displaced downward onto the blade 26 as shown in FIG. 11. The inlet openings 120 are dimensioned to receive the supports 28B so as to bring the bottom surface 116 of the handle 30B into abutment with the top surface 34 of the blade 26. Subsequent to the insertion of the supports 28B into their respective inlet openings 120, the handle 30B is displaced longitudinally in the direction indicated by arrow 133 relative to blade 26, thereby positioning each support 28B within its respective channel 122. Due to the dimensioning of the channels 122, each support 28B is wedged into engagement with its respective channel 122 to form a detachable engagement or union therewith.

Due to the shape of the supports 28B, i.e. the outwardly flared edges thereof, the handle 30B is precluded from being upwardly or laterally displaced. The wedging action of the supports against the sidewalls of the channels 122 preclude a displacement of the handle 30B relative to the blade 26 absent an application of a considerable force to the handle in the direction indicated by arrow 138.

Removal of the handle 30B from the blade 26 is accomplished by applying a force in the direction of arrow 138, thereby bringing the supports 28B into registration with their respective inlet openings 120 and thereafter displacing the handle 30B upward away from the blade 26.

Since the blade assembly, formed by the blade 26 and supports 28B, are flexible, the blade assembly adopts the configuration of the bottom surface of the base support 114 upon the mounting of the handle 30B onto the blade assembly. It follows that blade assemblies of various configurations can be obtained by configuring the bottom surface of the base support 114 accordingly. Observably, one blade assembly configuration may fit all of the various handle configurations.

Second Alternative Embodiment

A second alternative construction of the trowel handle 30 of the invention is illustrated in FIGS. 21-24 and is generally referenced as 30C. The particular construction has been constructed to avoid the complications which arise from adhesives, cement, or other paste-like materials entering into the inlets 120 and the channels 122 of each of slots 118 of the base support. It has been found that during the trowel's use, these materials often work themselves into the slots 118. When the handle 30 is separated from the blade 26, this material may remain in the slots 118. As the quantity of paste-like material in slots 118 builds up, eventually the supports 28B may not be fully inserted into their respective slots 118, since the paste-like material fills up the channels 122, or inlets 120 and precludes the entry of the supports therein. Observably, with the supports 28B not being fully inserted into channels 122, the union of the handle 30 with the blade 26 is incomplete. The failure to form a complete union of the handle 30 with the blade 26 can lead to the failure of either the trowel itself or the various components thereof.

The embodiment of FIGS. 21-24 addresses the problem of paste-like material buildup in the inlets 120 and channels 122. As shown, handle 30C defines a plurality of inlets 120 and channels 122 which are spacedly arranged in a linear arrangement in the base support 140. Similar to the construction of the base support 114 of FIG. 11, the base support 140 defines inlets 120 and channels 122 which extend only partially through the height of the base member 140. (See FIGS. 23 and 24.) Each inlet 120 is associated with a respective channel 122 to form a generally key slot-shaped recess well. As shown to advantage in FIG. 22, each inlet 120 has a larger width or diameter 139 than the width 138 of its respective channel 122. Further, as shown to advantage in FIG. 24, sidewalls of the channels 122 are angulated, i.e. the sidewalls 141 are angled from the horizon by an angle 143. The angle 143 corresponds generally with the angle 144 of the supports 28B (see FIG. 11). The channel sidewalls 141 are spaced part sufficiently to permit the entry of a respective support 28B into the inlet 120 and channel 122 and further to allow a close tolerance fit of the support 28B within the channel 122.

Figure 22:
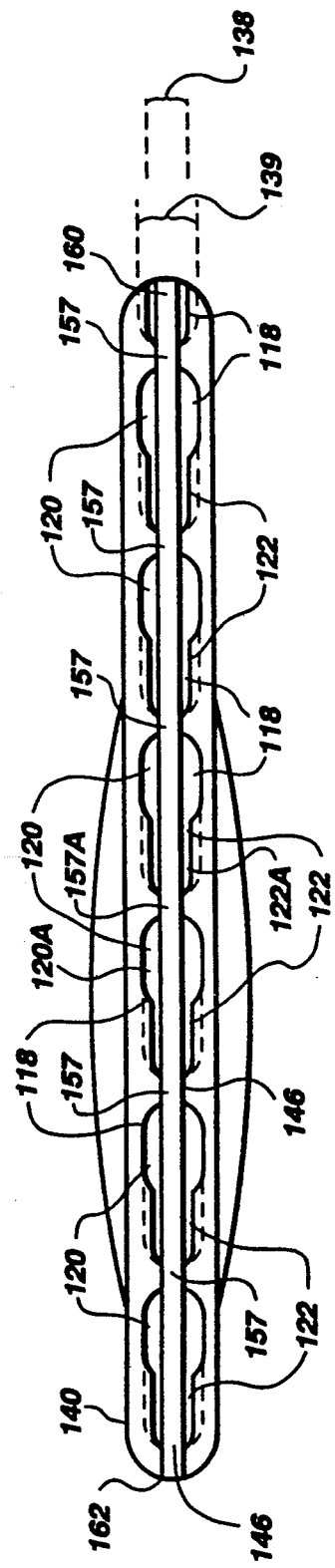
FIG. 22 is a bottom view of the handle shown in FIG. 21.

As shown to advantage in FIG. 22, an elongate channel 146 is configured in base support 140 to extend from the end 148 of base support 140 to the opposing end 150 of base support 140. As shown to advantage in FIGS. 24, channel 146 has a width 152 which is dimensionally smaller than the width 154 of inlet 120 and the width 156 of channel 122. Channel 146 interconnects each pair of inlets 120 and channels 122.

Figure 23:
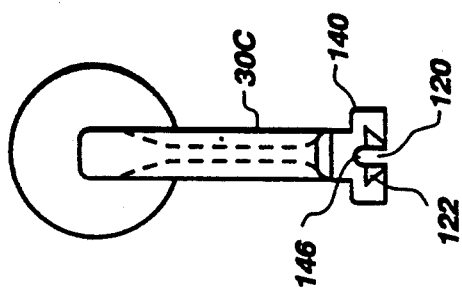
FIG. 23 is an end view of the handle shown in FIG. 21.
Figure 21:
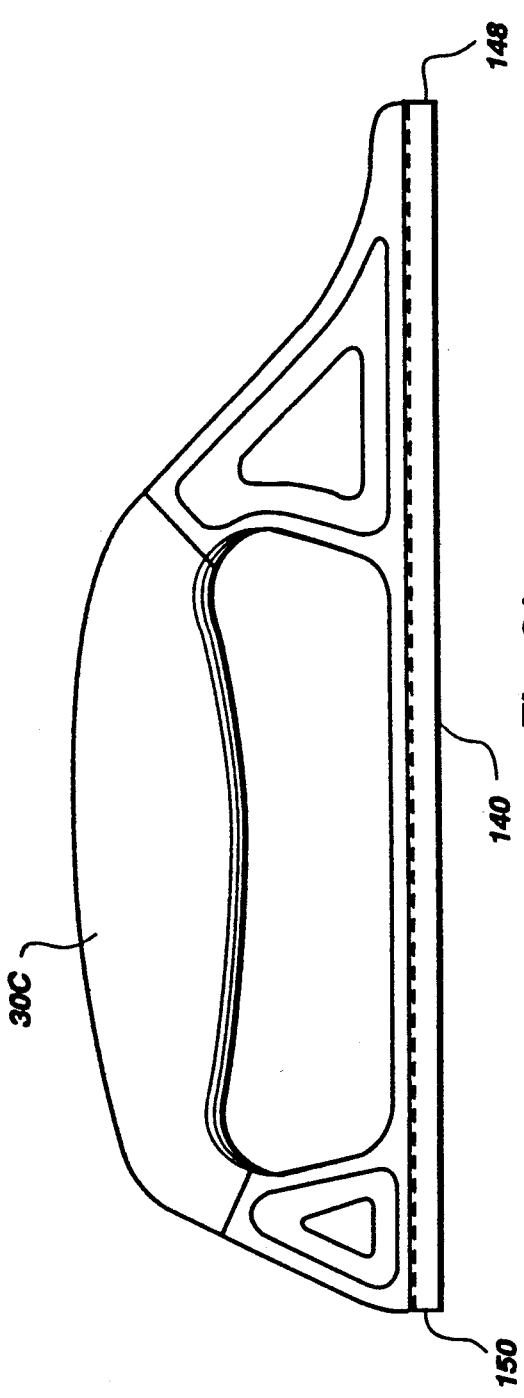
FIG. 21 is a side view of a second alternative embodiment of the trowel handle of the invention.
Figure 24:
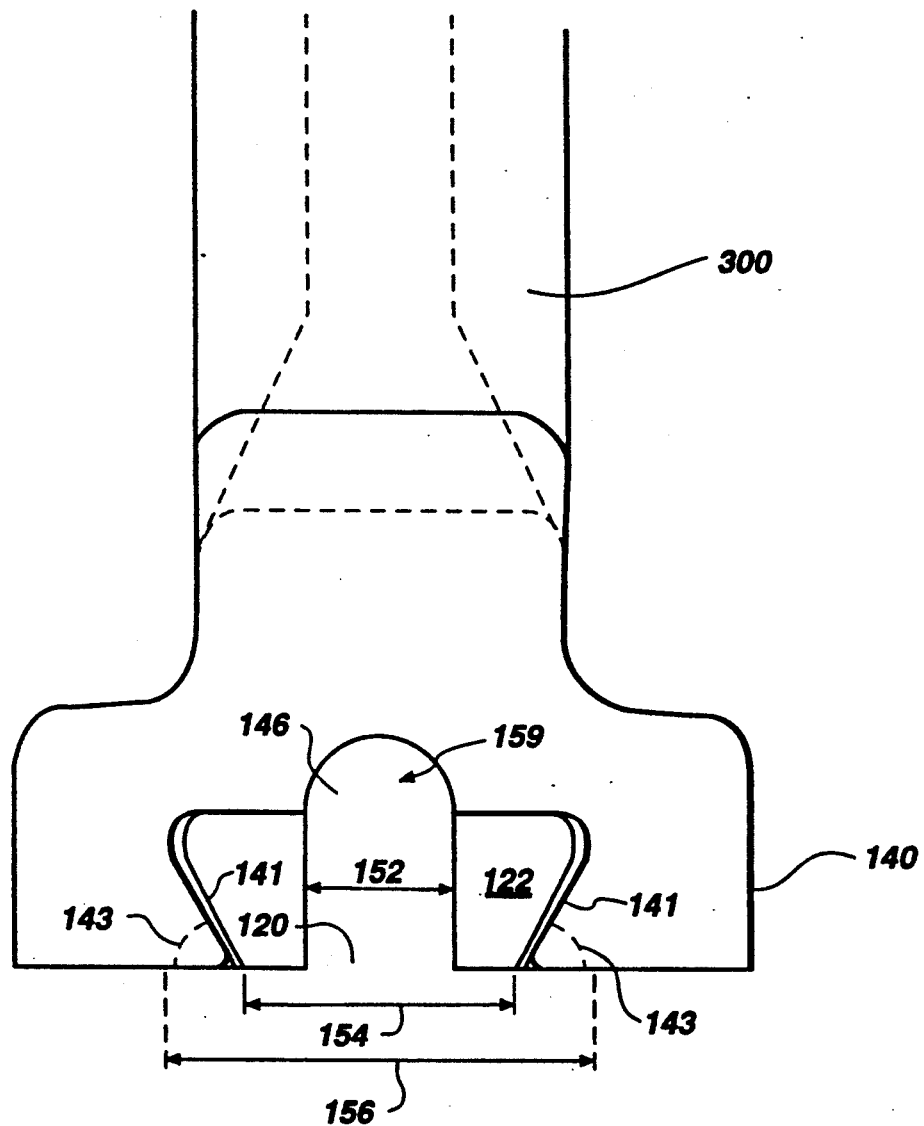
FIG. 24 is a partial sectional end view of the handle shown in FIG. 21.

As shown in FIGS. 23-24, the height of channel 146 is greater than the height of both the channels 122 and the inlets 120. It follows that any paste-like material which has worked itself into one of the inlets 120 or channels 122 may be forcedly driven from that inlet or channel by the entry of a support 28B into the channel 122 or inlet 120. The material may be driven into the region 157 of channel 46 interposed between an adjacent inlet 120 and channel 122 or alternatively into the region 159 of channel 122 which is positioned above the inlet 120 and channel 122.

Assuming the paste-like material is fluid, that material may flow from each inlet 120 and channel 122 pair to an adjacent inlet 120 and channel 122 pair. Eventually, the paste material may exit the base support 140 via either the channel 146's first outlet 160 or second outlet 162.

The width of channel 146, especially in the regions 157 between adjacent inlets 120 and channels 122 is measurably smaller than the width of supports 28B. It follows that the supports 28B can not be displaced through regions 157 from one channel 122 to an adjacent non-pair inlet 120. For example, in FIG. 22, a support 28B being received in channel 122A could not pass via channel 146 region 157A to reach inlet 120A.

As the user attaches the handle 30B to blade 26, it follows that any paste-like material residing in any of the channels 122 or inlets 120 are driven into channel 146 by the forced insertion of apparatus 28B into those channels and inlets. As channel 146 is filled, the paste material is driven outwardly through outlets 160 and 162.

Figure 25:
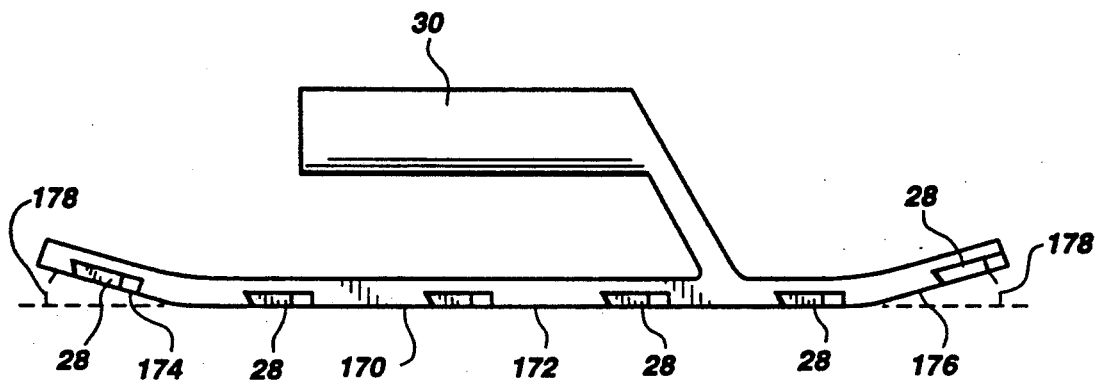
FIG. 25 is a side view of an alternative handle construction of the invention.
Figure 26:
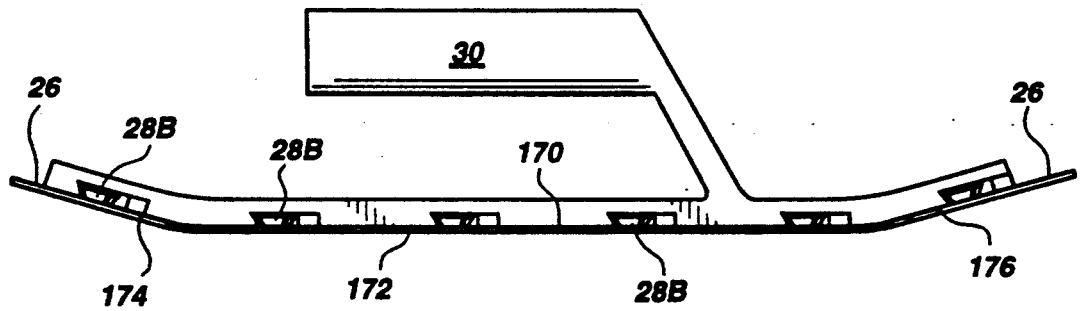
FIG. 26 is a side view of the handle of FIG. 25 shown in association with a flexible blade assembly.

FIGS. 25-26 illustrate an alternative embodiment of the invention wherein the handle 30 presents a lower, blade-engaging surface 170 which is not planar in configuration. As shown in FIG. 25, the handle 30 defines a lower surface 170 which is essentially planar (linear) along a central region 172 thereof and furthermore defines two planar or linear regions 174 and 176 which are defined at opposing ends of the central region 172. In side view, the handle's blade-engaging surface is a substantially "U"-shaped configuration with each of the regions 174 and 176 forming a respective wing-like section which extends outwardly at an angle 178 from the central region 172.

A blade assembly formed by a planar, rectangular blade 26 and its associated supports 28B forms a longitudinally flexible blade assembly. The blade assembly may be slidably mounted onto the handle 30 whereby the blade 26 assumes the configuration of the handle surface 170 as shown in FIG. 26. The invention therefore provides a handle and blade connection system whereby a desired blade configuration may be provided by configuring the bottom surface 170 of the handle 30 to present the desired configuration. The handle surface 170 is formed to define receiving apertures 28 therein each adapted to receive a respective support 28B. A flexible blade assembly may thereafter be slidably mounted to the handle 30 over the mounting surface 170 whereby the rigidity of the handle 30 and its mounting surface 170 forces the flexible blade 26 to conform to the shape of the surface 170, thereby yielding a working blade surface of the desired configuration.

While the illustrated embodiment depicts a blade handle 30 defining a substantially "U"-shaped mounting surface 170, it should be recognized that other mounting surface 170 configurations are within the contemplation of the inventor.

Figure 29:
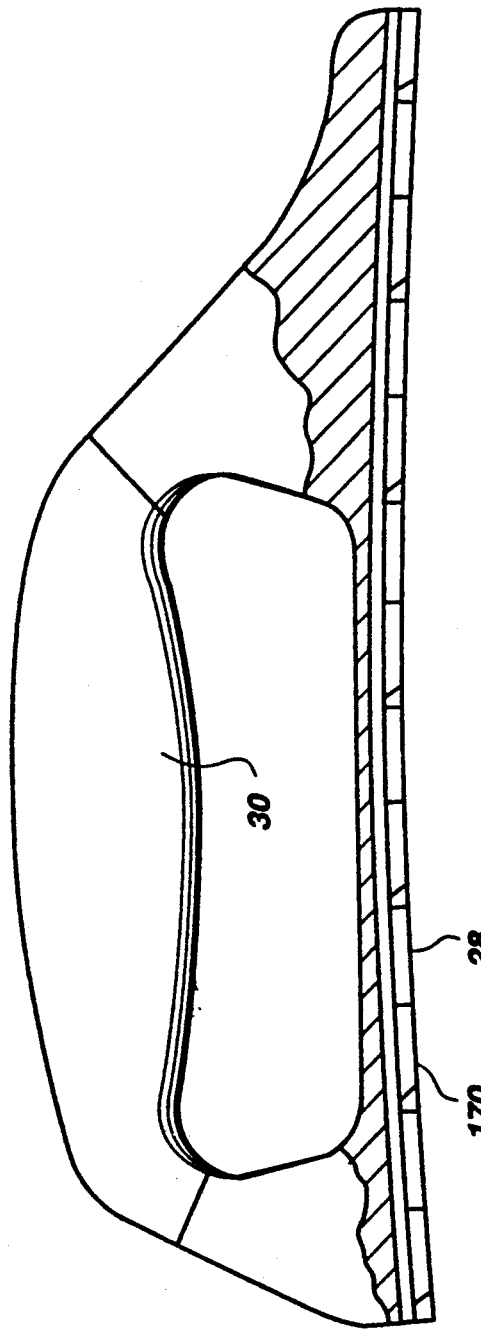
FIG. 29 is a side view of the handle of the construction of FIG. 27.
Figure 30:
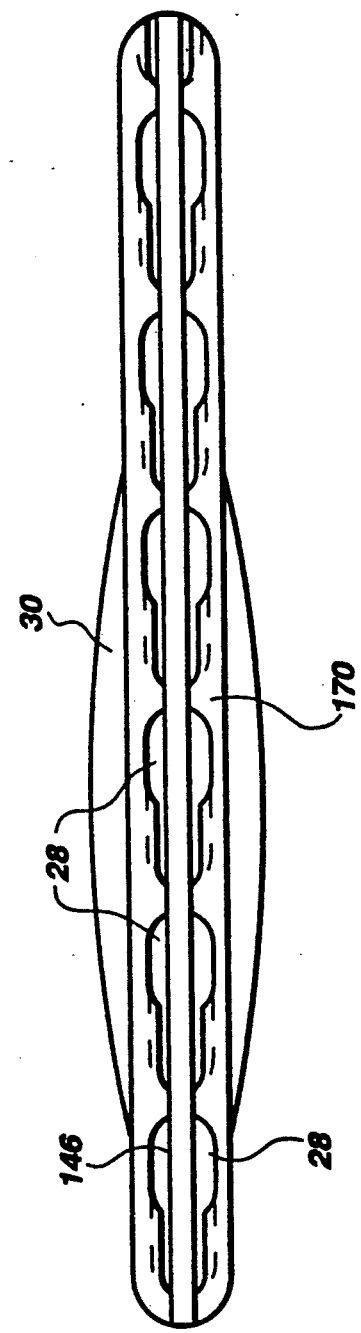
FIG. 30 is a bottom view of the handle of FIG. 29.

FIGS. 27-30 illustrate an alternative construction wherein the handle 30 is formed to define a continuously curved, concavely configured bottom surface 107A. As shown in FIG. 30, surface 170A defines a plurality of keyhole-shaped slots 28 and a channel 146 which interconnects the various slots 28, thereby providing a means of draining those slots of adhesive which may have entered therein. FIG. 27 illustrates the blade assembly, formed by planar panel 26 and a plurality of linearly spaced upstanding supports 28B mounted thereon. The blade assembly is sufficiently flexible that it can be slidingly mounted onto handle 30 whereby each support 28B is slidingly received and retained within a respective keyhole slot 28. Further, due to the flexibility of the blade assembly and the spaced mounting of the supports, the blade assembly conforms to the bottom surface 170A such that the bottom surface of blade 26 presents a concave surface. Due to the rigid nature of the handle 30, the blade assembly is retained in this configuration during use.

The particular construction shown in FIGS. 27-30 is particularly useful as a sheet rock trowel for mudding over taped seams.

Those skilled in the art will recognize that the embodiments hereinbefore discussed are illustrative of the general principles of the invention. The embodiments herein described are not intended to limit the scope of the claims which themselves recite what applicant regards as his invention.

What is claimed:

1. A trowel comprising:
   a flexible blade;
   a plurality of upstanding tapered supports mounted centrally on said blade to extend longitudinally along said blade, each support having the shape of an inverted truncated cone, said blade and said supports forming a longitudinally flexible blade assembly; and
   a rigid elongate handle defining a plurality of channels therein, each of said channels being interconnected to an adjacent said channel by means of a drain channel, each channel having tapered sidewalls and an inlet openings, each said channel being configured to slidably receive a respective said support through said inlet opening and form a detachable union therewith upon a longitudinal displacement of said handle along said blade, said channels each having sidewalls tapered along their length positioned to form a pressure fit with a respective support along a height of each said respective support;
   wherein said rigid handle is positioned centrally on said blade to extend along a length thereof to longitudinally stiffen said flexibility blade assembly.

2. The trowel according to claim 1 wherein said supports are configured as truncated cones.

3. The trowel according to claim 1 wherein said plurality of supports are mounted in a linear array on said blade.

4. The trowel of claim 1 wherein said drain channel has a width which is dimensionally smaller than a width of each of said channels.

5. The trowel of claim 1 wherein said drain channel is positioned elevationally above said channels.

6. The trowel of claim 1 wherein said drain channel includes at least one outlet means adapted for withdrawing fluid material from said channels and discharging said material from said rigid elongate handle.

7. A trowel comprising:

a flexible blade;

a plurality of upright supports mounted on said blade, each support having tapered sidewalls, said blade and said supports forming a longitudinally flexible blade assembly;

a substantially rigid handle defining a plurality of open channels therein, each channel including an inlet opening and a tapered open-sided elongate region having at least one beveled flange extending into said open side, each of said channels being interconnected to an adjacent said channel by means of a drain channel;

each said channel receiving a respective said support and forming a detachable union therewith upon a longitudinal displacement of said handle relative to said blade, each beveled flange abutting against a corresponding tapered support sidewall to form, a pressure fit along a height of said support and said flange, said substantially rigid handle having a bottom surface;

wherein said substantially rigid handle longitudinally stiffens said flexible blade assembly and forces said flexible blade to longitudinally conform to a longitudinal configuration of said bottom surface of said substantially rigid handle.

8. The trowel according to claim 7 wherein each said elongate region is defined by tapered sidewalls which extend along a length thereof.

9. The trowel according to claim 7 wherein each said support is configured as an inverted truncated cone.

10. The trowel according to claim 7 wherein each said channel is configured as a keyhole.

* * * * *

UNITED STATES PATENT AND TRADEMARK OFFICE
CERTIFICATE OF CORRECTION

PATENT NO. : 5,193,244

DATED : 3/16/93

INVENTOR(S) : Lawrence G. Meyers

It is certified that error appears in the above-identified patent and that said Letters Patent is hereby corrected as shown below:

On the Title Page, Item [54], "HAND" should read -- HANDLE --;

In Column 1, in the title, change "HAND" to --HANDLE--;

In Column 1, line 44, delete "a";

In Column 1, line 60, change "are" to --is--;

In Column 2, line 48, delete "surface";

In Column 3, line 17, after "In" insert --one--;

In Column 4, line 28, change "View" to --view--;

In Column 4, line 66, after "34," insert --and--;

In Column 6, line 51, change "axis" to --axes--;

In Column 6, line 56, change "20" to --30--;

In Column 7, line 21, change "17" to --16--;

In Column 8, line 65, change "part" to --apart--;

UNITED STATES PATENT AND TRADEMARK OFFICE
CERTIFICATE OF CORRECTION

PATENT NO. : 5,193,244

DATED : 3/16/93

INVENTOR(S) : Lawrence G. Meyers

It is certified that error appears in the above-identified patent and that said Letters Patent is hereby corrected as shown below:

In Column 9, line 4, change "FIGS." to --FIG.--;

In Column 9, line 28, change "can not" to --cannot--;

In Column 10, line 12, change "107A" to --170A--;

In Column 10, line 52, "openings" to --opening--;

In FIGS. 29 and 30, change "170" to --170A--.

Signed and Sealed this

Twelfth Day of July, 1994

*Attest:*

BRUCE LEHMAN

*Attesting Officer*     Commissioner of Patents and Trademarks